(12) United States Patent
Schneider

(10) Patent No.: US 7,004,806 B1
(45) Date of Patent: Feb. 28, 2006

(54) SHARK DETERRENT DEVICE

(75) Inventor: David P. Schneider, 1116 Old State Rd., Binghamton, NY (US) 13904

(73) Assignee: David P. Schneider, Apalachin, NY (US)

( * ) Notice: Subject to any disclaimer, the term of this patent is extended or adjusted under 35 U.S.C. 154(b) by 0 days.

(21) Appl. No.: 10/626,918

(22) Filed: Jul. 24, 2003

Related U.S. Application Data

(63) Continuation-in-part of application No. 09/981,441, filed on Oct. 18, 2001, now abandoned.

(51) Int. Cl.
*B63B 22/00* (2006.01)

(52) U.S. Cl. ............... 441/1; 441/32; 441/80
(58) Field of Classification Search ............ 441/1, 441/32, 33, 80, 86, 106, 107, 108, 109, 110, 441/111, 112, 113, 114
See application file for complete search history.

(56) References Cited

U.S. PATENT DOCUMENTS

| | | | | |
|---|---|---|---|---|
| 2,911,649 A | * | 11/1959 | Ruelle et al. | 2/69.5 |
| 2,950,488 A | * | 8/1960 | Sabo | 441/116 |
| 3,280,549 A | * | 10/1966 | Hsu | 60/721 |
| 4,602,384 A | * | 7/1986 | Schneider | 441/103 |
| 4,917,280 A |   | 4/1990 | Schneider | |
| 4,933,187 A |   | 6/1990 | Schneider | |
| 5,234,144 A | * | 8/1993 | Iler | 224/191 |
| 5,603,648 A | * | 2/1997 | Kea | 441/106 |

FOREIGN PATENT DOCUMENTS

GB  2 176 732 A  *  1/1987

OTHER PUBLICATIONS

Joseph A. Sisneros & Donald R. Nelson, Surfactants as chemical shark repellents, Enviromental Biology of Fishes, 2001, 117-129, 60, Kluwer Academic Publishers, Netherlands.

* cited by examiner

*Primary Examiner*—Sherman Basinger
(74) *Attorney, Agent, or Firm*—David P. Schneider

(57) ABSTRACT

A rescue flotation buoy integrated with a pressurized containment and dispensing device containing a pressurized repellent for sharks. Sodium lauryl sulfate, a well-known shark repellent, is one such material that could be utilized. The repellent material can be dispensed more than one time by the use of a valve connected to the containment and dispensing device. The integration of a rescue flotation buoy and a shark repellent will allow rescue personnel to repel sharks when saving a victim of a shark attack. The purpose is to expose the predator to an immediate high concentration of the appropriate repellent, thereby diverting the predator from its attack. Subsequent applications of the shark repellent can also be performed.

6 Claims, 2 Drawing Sheets

SHARK DETERRENT DEVICE

RELATED APPLICATIONS

This is a Continuation-in-Part of prior U.S. patent application Ser. No. 09/981,441, filed on Oct. 18, 2001. This prior application is now abandoned.

FIELD OF THE INVENTION

The present invention relates to a dispensing device for deterring shark attack and, more particularly, to a dispensing device integrated into a rescue flotation buoy, providing serial multiple application of a shark repellent material.

BACKGROUND OF THE INVENTION

Sharks are an all-too-common threat to swimmers, boating enthusiasts, and personnel whose work exposes them to the ocean. It is not uncommon to learn of shark attacks along the coasts even in shallow water. Of course, sharks are known to frequent deep water as well, where competent swimmers, surfboarders, scuba divers, workers including oil platform personnel, and seamen of all types are more likely to be present.

To date, means of deterring shark attack include the teachings of U.S. Pat. Nos. 4,602,384, 4,917,280, and 4,933,187. These patents disclose the use of coated chemical pellets and the various protective coatings utilized to prolong or prevent the dissolution of the chemical pellets. In addition, devices such as "bang sticks," providing the capability of discharging explosive shells in contact with sharks, are sometimes carried by scuba divers. These are used conveniently only one time, and may leave the user in the vicinity of a wounded and bleeding animal. Thrashing of wounded animals or panicked humans in need of rescue, as well as the presence of blood in the water are known to draw sharks to their vicinity. As a result, it is at times desirable to have an immediate and voluminous dispersal of shark repellent to deter or interrupt shark attacks, and to accomplish this while specifically operating in a manner that does not further attract the presence of sharks, without wounding animals and putting blood into the water.

An appropriate device for this purpose, particularly one that would be effectively used in a rescue situation where the victim being rescued will often be panicked and thrashing about, and may be injured and bleeding, will be capable of serial multiple application of shark repellent. This invention relates to a device providing such deterrence. Rescue personnel such as lifeguards at present typically have no means of repelling sharks that may be attracted to the scene of a rescue, and instead usually perform the rescue of the victim with only a flotation buoy in hand.

SUMMARY OF THE INVENTION

It is an object of the present invention to provide, on demand, serial and multiple discharges of an appropriate shark repellent material, discharged from a material containment and dispensing device, housed inside a rescue flotation buoy. The containment and dispensing device may be constructed of a heavy-duty plastic or metal material, and may be similar in form and dispensing function to commonly used fire extinguishers. The shark repellent, which may be a chemical such as sodium lauryl sulfate, is housed inside the dispensing device in a liquid, dry, or gel form. The repellent will be delivered at or in the area of an approaching shark, thereby repelling the shark. This flotation and dispensing device would best be utilized by rescue personnel, but could also be used by others as a flotation device with shark repellent capability on boats and beaches, and in any situation where shark deterrence and flotation assistance is appropriate.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENTS

Figure 1:
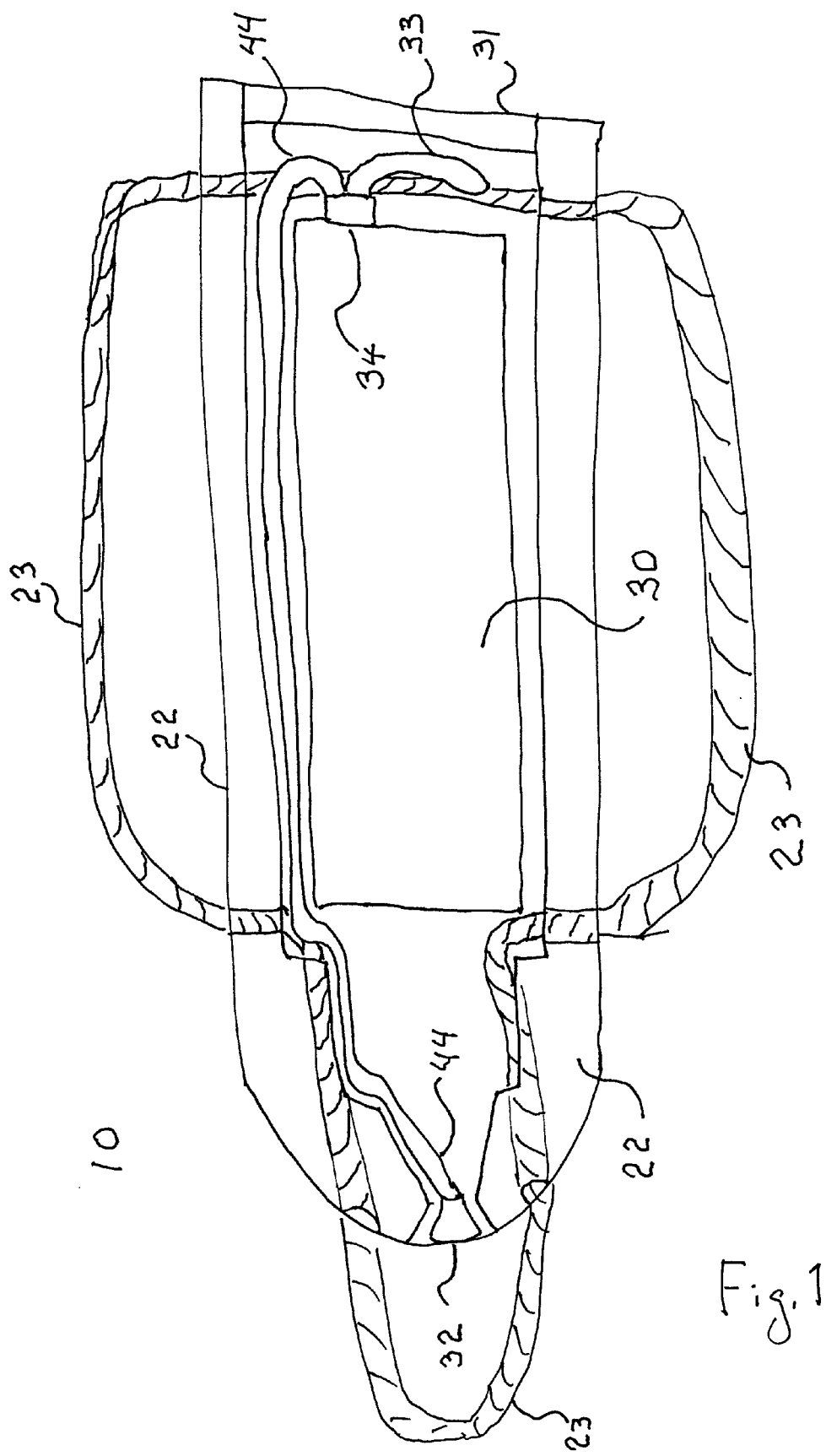
FIG. 1 is a cross-sectional view of the rescue flotation buoy of the present invention showing a material containment and dispensing device installed as the repellent system.

Referring now to the drawings, there is shown in FIG. 1 a cross-sectional view of the repellent system 10, which shows a wet chemical containment and dispensing device 30 installed inside a rescue flotation buoy 22. The flotation buoy 22 could be made of foam, cork, or plastic, etc. and can have attached ropes 23 or other means to act as handles. This flotation buoy 22 could be of rigid construction or could be, for example, made of a rubber filled fabric so it could be of an inflatable design. The containment and dispensing device 30 is internally incorporated into the flotation buoy 22, and holds a specific shark repellent, not shown, such as sodium lauryl sulfate. The containment and dispensing device may be pressurized, and hold a propellant, not shown, as well as a specific shark repellent. Such a device 30 could be made from plastic, metal, and may be coated with a coating to resist degradation or corrosion that might be caused by the use environment, salt water, or the specific repellent. The dispensing action of the dispensing device 30 is provided by a spring loaded squeeze grip 33 that dispenses repellent when the squeeze grip 33 is squeezed, opening a dispensing valve 34. The squeeze grip 33 operates in a manner such that the spring loaded grip 33 returns by means of the spring, not shown, to a resting or home position, closing the dispensing valve 34, when the squeezing action is released.

A containment release 31 allows the device 30 to be removed from its mounting in the flotation buoy 22 so that it can be refilled as necessary. A nozzle 32 is supplied repellent by the manual opening of the dispensing valve 34, using the squeeze grip 33. The repellent charge is thus released in the direction of the shark, not shown.

Use of such a pressurized dispensing device 30 enables a user to serially eject multiple shots of repellent, as opposed to a single shot provided by a single application mechanism. If a shark is not completely repelled by a first shot of repellent, the user may eject a second shot, greatly improving the chances for repelling the shark. It is also foreseeable that a shark, having been repelled by a first shot of repellent, might be attracted back to the place where a rescue is occurring. This is because a victim may be struggling or splashing, or be injured and bleeding. At that point the user might again eject an additional shot of repellent, to again repel the shark. Such a dispensing device can expel not only liquid contents but also dry, granular chemicals or a chemical gel. The shark repellant can be provided in any of these forms.

Figure 2:
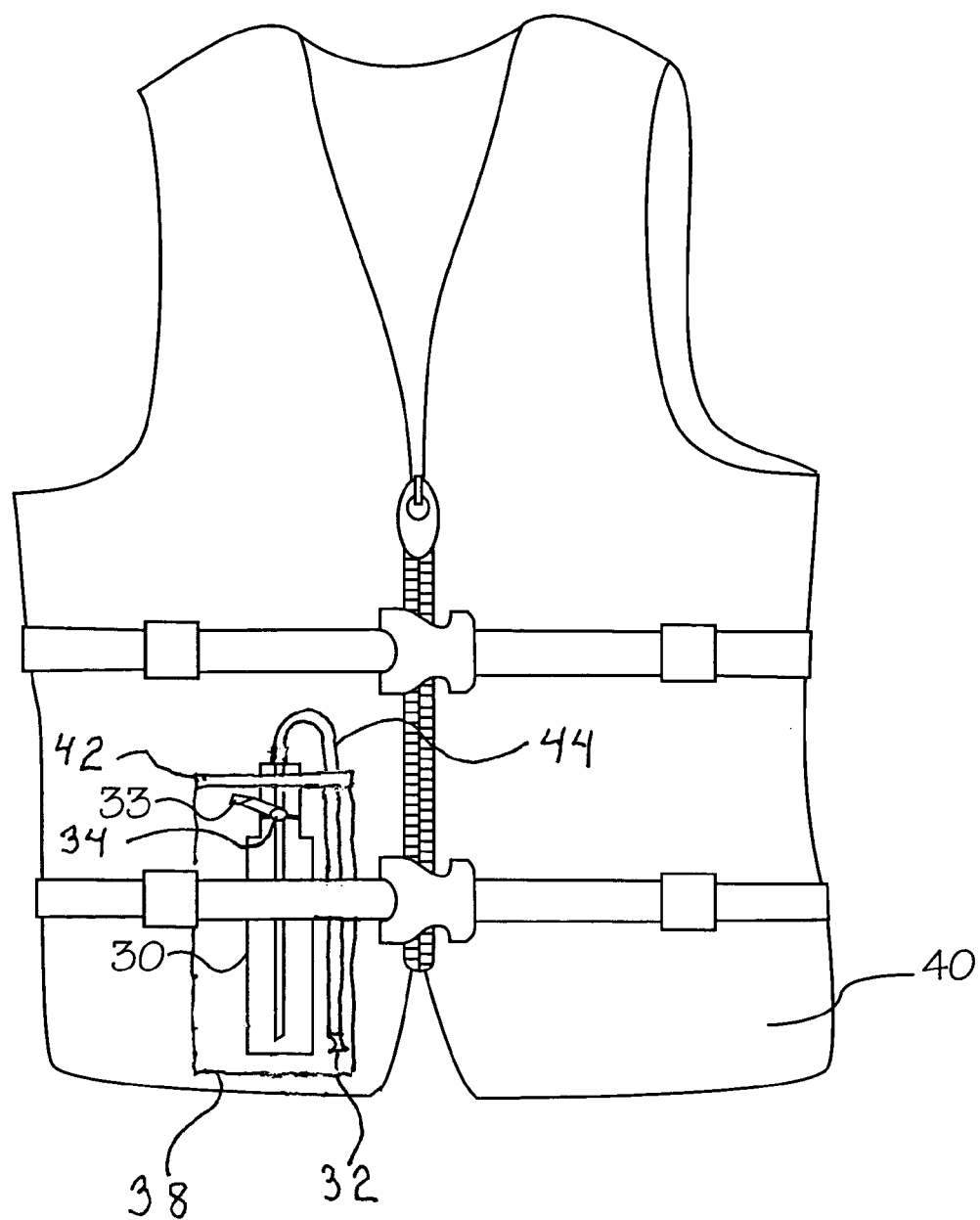
FIG. 2 is a front view of an auto-inflating or self-inflating flotation vest integrated with a shark repellent containment and dispensing device.

Referring again to the drawings, there is shown in FIG. 2 a front view of an alternate embodiment of the flotation and repellent system, which shows the repellent material containment and dispensing device 30 installed in a pocket 38 of an auto-inflation or self-inflation vest 40. Such pocket 38 has a closure device 42 such as a snap or zipper to prevent the inadvertent dislodgement of the device 30. The closure device 42 is capable of opening to allow the device 30 to be removed and refilled with repellent and/or propellant.

The vest 40 could be made of flexible material for ease of motion while wearing the vest 40 in its uninflated state, such material being air impermeable, to retain flotation ability once inflated. Such vests are most often utilized by sailors, fisherman, and others who work in the vicinity of water, such as ocean oil rig workers, etc. The inflatable design of vest 40 allows workers to be less physically encumbered when working, and in case of an accident or emergency in which the worker is forced into the water, the auto/self-inflating vest 40 would provide the worker a safety flotation device.

Obviously, the incorporation of a shark repellent into the vest 40 provides another means of safety protection for a user in water in case of a possible shark attack. The containment and dispensing device 30 holds the specific shark repellent. Again, the nozzle 32 is supplied repellent by the manual opening of the dispensing valve 34, using the squeeze grip 33, thru a flexible tube 44, so that the repellent charge thus released is directed by the wearer of the vest 40 in the direction of the shark, not shown. As above, the spring loaded grip 33 returns by means of the spring, not shown, to a resting or home position, closing the dispensing valve 34, when the squeezing action is released.

Clearly the embodiments of this invention could be successfully effected using many different types of materials other than those described herein. For example, the flotation buoy 22 may be provided in a version with an environmentally rugged hard plastic shell, or in a less expensive polystyrene foam plastic or other low cost version. Also, the repellent chemical could be in the form of powders or liquids or a gel. Removing through evaporation much of the liquid water contents from a liquid such as a sodium lauryl sulfate solution or another shark repellent, for instance, could create such a gel.

When housed inside a flotation buoy 22, dispensing device 30 could be made to be removable from such a flotation buoy 22 for recharging with more repellent material and propellant after it had been used to discharge its previous load of such repellent material.

The propulsive force that ejects the repellent material could be generated in different ways. One possibility is a pressure chamber holding compressed gas or liquids which when released, could force the repellent chemicals through the nozzle 32 of the dispensing device 30. A mixture of chemicals that cause the generation of a propulsive force of gas, when mixed together, could be useful in ejecting the repellent chemicals. Also, solid chemicals such as calcium carbide could be stored in separate containers until used, when they would be mixed with water to generate a propulsive gas for instance. Pressurized air, $CO_2$ or other gas or a liquid that is gaseous at atmospheric pressure could be provided in the containment and dispensing device 30 and utilized for the necessary propulsion.

The repellent chemicals can have greater repellent action if mixed only at the immediate time when they are being released. More caustic or acid repellent effects could be available by mixing the necessary ingredients as they were being ejected.

Since other modifications and changes varied to fit particular operating requirements and environments, including changes in the size and scale of the containment and dispensing device, will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A shark repellent apparatus comprising:
   A rescue flotation buoy having a nozzle at a first end, a containment release at a second end and at least one handle located between said first and second ends;
   A pressurized repellent material containment and dispensing device having a proximal end and a distal end, said containment and dispensing device being received within said rescue flotation buoy during use and being removable therefrom;
   Dispensing means for serially dispensing multiple applications of shark repellent material, said shark repellant material comprising sodium lauryl sulfate, said dispensing means being disposed at said proximal end of said containment and dispensing device and being disposed at said second end of said rescue flotation buoy, said dispensing means comprising a valve, a spring loaded squeeze grip and a tube connecting said valve to said nozzle; and
   Wherein said containment and dispensing device is removable from said rescue flotation buoy through said containment release for refilling with said shark repellant.

2. The shark repellant apparatus as set forth in claim 1, wherein each one of said multiple applications is effective in repelling a shark.

3. The shark repellant apparatus as set forth in claim 1, wherein said flotation buoy comprises an environmentally rugged hard plastic shell.

4. The shark repellent
   apparatus as set forth in claim 1 wherein said flotation buoy comprises a low cost foamed plastic.

5. The shark repellant apparatus as set forth in claim 4, wherein said low cost foamed plastic is polystyrene.

6. The shark repellant apparatus as set forth in claim 1 wherein said flotation buoy is inflatable.

* * * * *